April 14, 1942.    E. A. RAVENSCROFT    2,279,505
CAPSULE MAKING MACHINE
Filed July 10, 1939    5 Sheets-Sheet 2

Inventor:
Edward A. Ravenscroft,
By Fisher, Clapp,
Soans & Pond
Attorneys.

Patented Apr. 14, 1942

2,279,505

UNITED STATES PATENT OFFICE 2,279,505

CAPSULE MAKING MACHINE

Edward A. Ravenscroft, Glencoe, Ill., assignor to Abbott Laboratories, North Chicago, Ill., a corporation of Illinois Application July 10, 1939, Serial No. 283,602

10 Claims. (Cl. 18—21)

My invention relates generally to machines for manufacturing filled capsules and is particularly concerned with automatic machines for manufacturing soft gelatin capsules which are filled with liquid medicaments or the like.

Vast quantities of liquid filled, soft gelatin capsules are used annually in the pharmaceutical and drug industries for dispensing various types of liquid medicaments, and for many years there has been a need for a capsule making machine which when supplied with suitable raw materials will automatically manufacture liquid filled, soft gelatin capsules of uniform size and shape at relatively high speeds and at low cost, while at the same time assuring the preservation of absolutely sanitary conditions throughout the manufacturing operations.

A capsule making machine capable of fulfilling the above stated requirements is disclosed in application Serial No. 130,534 which was filed on March 12, 1937 and which is assigned to the assignee of this application. This machine, however, operates by forming a tube of gelatin, as by extrusion, next filling an end portion of the tube with the liquid medicament under pressure which expands the filled portion into a mold, and finally cutting off that portion to form a capsule.

While this mode of operation appears to be very satisfactory for the manufacture of certain types of capsules, under some circumstances, it is more advantageous to form the capsules from flat sheets of gelatin rather than by the use of a tube, and the principal object of the present invention is to provide an improved capsule making machine of the class described which will automatically manufacture liquid filled, soft gelatin capsules, of uniform size and shape, at high speeds through the use of continuous lengths or strips of soft gelatin.

Other objects of my invention are to provide a simple, foolproof capsule making machine which is capable of continuous, reliable operation over long periods of time with little or no supervision by the operator; to provide an improved capsule making machine which can be readily cleaned and sterilized and which can be changed over from the manufacture of capsules filled with one medicament or other liquid filling material to the manufacture of capsules filled with a different filling material within a relatively short period of time and with little or no adjustment; to provide a capsule making machine of the subject type which shall effectively utilize the raw materials with which it is supplied with a minimum of waste; and generally, to provide an improved machine for manufacturing liquid filled, soft gelatin capsules.

One embodiment of my invention is illustrated in the accompanying drawings, wherein—

Reduced to its simplest elements, the capsule making machine of my invention includes automatic means for forming two relatively narrow, continuous sheets or strips of gelatin; a flat wedge shaped nozzle mechanism; means for moving said sheets simultaneously along opposite sides of said nozzle; means suitable to hold both sheets in contact with each other so as to form an expansible envelope or sack which connects with the nozzle outlet; pump mechanism or the like for injecting a measured quantity of the liquid filling material into each such envelope or sack through the nozzle outlet with which it connects; annular cutter means actuable to form a capsule from each filled envelope or sack by simultaneously cutting the filled envelope or sack from the two strips by an operation which seals the cut edges; and means for removing the finished capsule and the unused portion of the sheets from the machine. This mode of operation requires intermittent movement of some of the mechanical elements of the machine, and certain of the mechanism utilized for accomplishing this intermittent movement also constitutes an important feature of the present invention.

Figure 1:
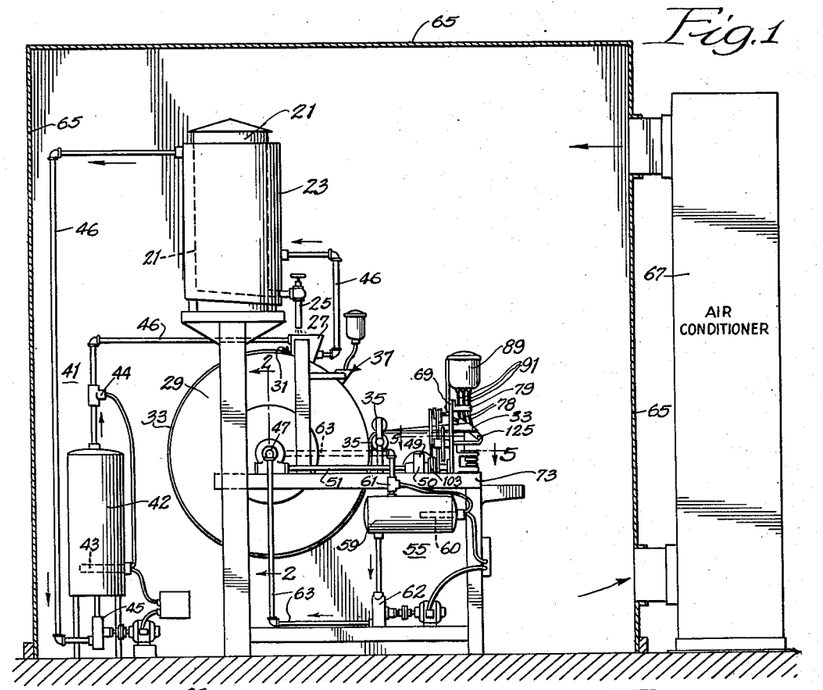
Figure 1 is a diagrammatic view illustrating a capsule making machine in accordance with the present invention, together with certain auxiliary apparatus.
Figure 2:
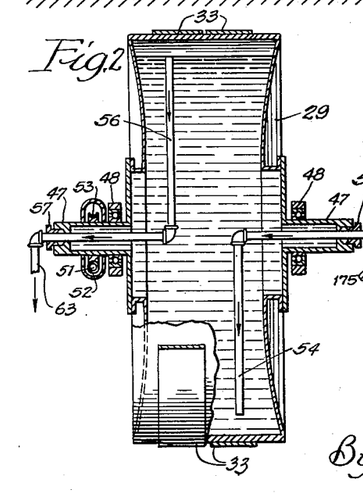
Figure 2 is an enlarged, fragmentary view, partially in section, of a portion of the auxiliary apparatus illustrated generally in Figure 1.

Referring particularly to Figures 1 and 2 of the drawings, the gelatin strip forming mechanism illustrated therein includes a suitable enclosed hopper or reservoir 21 for containing a substantial quantity of liquid gelatin. The hopper or reservoir 21 is jacketed, as illustrated at 23, and is provided with a valve controlled outlet pipe 25 adapted to discharge into an elongated, jacketed trough 27 supported adjacent a hollow, rotatable drum 29, as illustrated in Figure 1.

The trough 27 has an open bottom which is closed by the drum 29 except for two relatively narrow, elongated discharge openings 31 of substantially the same dimensions as the strips which are to be formed by the mechanism. Molten gelatin is fed from the trough 27 onto the surface of the drum 29 through these discharge openings, and the surface temperature of the drum 29 is maintained sufficiently low to solidify the gelatin so fed into continuous strips 33 which are ultimately conducted away from the strip forming mechanism by suitable power driven take-off rolls 35.

In order to prevent the gelatin strips 33 from sticking to the surface of the drum 29, a thin coating of mineral oil is continuously applied to that surface by a suitable trough lubricator indicated at 37, and to prevent sticking at the take-off rolls 35, the surface of at least the lower of the take-off rolls should also be lubricated. The gelatin in the hopper 21 and the trough 27 is maintained molten at the desired temperature by means of a suitable heat exchanger system 41 which includes a reservoir 42 for the heat exchanger fluid, an electric heating unit 43, a thermostat control 44 for the heating unit 43 which maintains the heat exchanger fluid in the reservoir 42 at the proper temperature, a motor driven pump 45 for circulating the heat exchanger fluid through the jacket of the trough 27 and the jacket 23 of the gelatin reservoir 21, and suitable connecting piping 46.

The drum 29 is preferably of metallic construction and comprises a smooth surfaced, hollow, cylindrical body supported for rotative movement by two short, hollow shafts 47 which are journaled in suitable ball bearings 48. When the machine is in operation, the drum 29 is continuously rotated at slow speed by the main drive motor 49, that motor being operatively connected to the drum through a speed reducing mechanism 50, a worm drive shaft 51, a worm 52, and a worm gear 53 keyed to one of the short shafts 47. To assure proper formation of the gelatin strips 33, the temperature of the surface of the drum 29 must be quite accurately controlled, and to this end the drum is provided with inlet pipes 54 and outlet pipes 56 for connecting to a heat exchanger system 55 whereby a heat exchanging fluid may be circulated through the interior thereof. Gland seals 57 prevent leakage around the inlet and outlet pipes. The heat exchanger system 55, similarly to the system 41, includes a reservoir 59 for the heat exchanger fluid, an electric heating unit 60, an adjustable thermostatic control 61 for the heating unit 60, a motor driven circulating pump 62, and suitable piping 63 for connecting the system to the drum inlet and outlet pipes 54 and 56.

For most satisfactory results, the complete apparatus, including the gelatin strip forming mechanism and the capsule making machine proper, should be operated within a sealed room, the walls of which are illustrated at 65 in Figure 1, and air conditioning apparatus 67 should be provided for maintaining accurate control of the room temperature and humidity. An arrangement of this character not only results in a much more uniform product, because of the stabilizing of the gelatin thereby made possible, but also permits the convenient obtaining of aseptic conditions during manufacture of the capsules.

For supporting the wedge shaped nozzle and certain other elements of the capsule making machine proper, the apparatus is provided with a rectangularly shaped upright 69 which is rigidly affixed to the horizontal main frame 73. The nozzle illustrated at 71 in the drawings is of a particularly suitable type, and is made from a rectangularly shaped, relatively thin, metallic plate provided at its lower end with a wedge shaped end portion 75. The nozzle is supported upon the upright 69 by means of a suitable bracket 77 (Figure 3) or the like.

Any reasonable number of capsules can be made simultaneously by the machine of my invention. The particular apparatus illustrated in the drawings is adapted to make three capsules during each operation, and accordingly the nozzle 71 is provided with three longitudinally extending passageways 77 through which the filling fluid is conducted to the interior of the individual gelatin sacks formed at the outlet ends thereof. The upper end of each of the nozzle passageways 77 is connected by means of a short piece of tubing 78 to a separate, piston type, measuring pump 79.

The measuring pumps 79 are rigidly supported upon the upright 69 by means of a bracket 83, and the pistons of all of the pumps 79 are preferably mechanically connected to a common cross head 85 which is slidably supported upon the upright 69 by a suitable guide 87. The measuring pumps 79 are individually connected to the reservoir 89 for the liquid filling material by piping or tubing 91.

The three measuring pumps 79 are simultaneously operated to fill the three envelopes or sacks formed at the outlet ends of the nozzle passageways 79 at the proper instant during the capsule making operation in response to rotation of a cam 93 which is mechanically connected to the common cross head 85 by a link 95 and a pivoted cam follower 97. The cam follower 97 preferably engages the cam 93 through a roller 98 and is biased into engagement with the cam by a spring 99. To permit convenient control of the amount of filling material which is pumped during each stroke of the measuring pump 79, the pivotal connection between the link 95 and the cam follower 97 is adjustable longitudinally along the cam follower 97 as indicated by the arrows in Figure 3.

The pump cam 93 is keyed to a horizontally extending rotatable shaft 100 which is supported at one end by a bearing 101 affixed to the upright 69 and at its other end by a suitable outboard bearing support 102 attached to the base 73. During the operation of the machine, the pump cam 93 is rotated continuously at uniform speed by the main drive motor 49, the cam being mechanically connected to a low speed power take-off shaft 103 leading from the motor driven speed reducing mechanism 50 by means of a gear 104 keyed to the power take-off shaft 103, a gear 105 keyed to a horizontal intermediate shaft 106 which is supported at one end by an outboard bearing 107 affixed to the main frame 73 and at the other end by a bearing 108 attached to the upright 69, a chain 109 connecting the gears 104 and 105, a second gear 110 keyed to the intermediate shaft 106, a gear 111 keyed to the pump cam shaft 99, and a second chain 112 connecting the gears 110 and 111 (see Figure 7).

Figure 6:
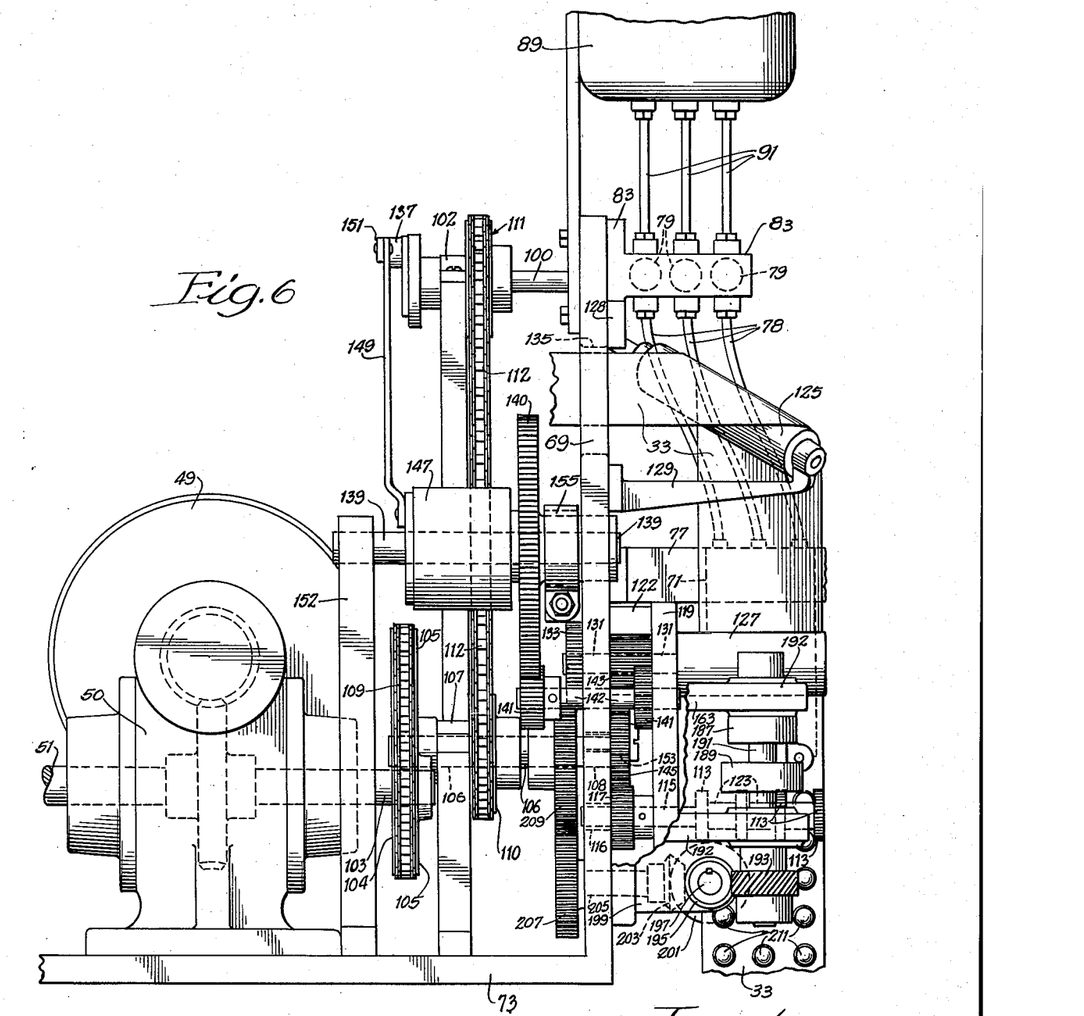

The gelatin strips 33 are drawn across the opposite faces of the nozzle 71 by means of a pair of power driven squeeze rolls 113. These rolls are supported a short distance below the wedge shaped end portion 75 of the nozzle 71 by means of two suitable short shafts 115. The inner end of each shaft 115 is journaled in a suitable bearing 116 (Figure 6) attached to the upright 69, and the shafts 115 are mechanically connected together by two gears 117 which are held in place by a retainer plate 119 releasably attached to, and spaced from, the upright 69 by four screws 121 and four spacer sleeves 122. The squeeze rolls 113 are provided with annular grooves 123 which align in the completed machine to form passageways through which the finished capsules can be removed. The engaging surfaces of the squeeze rolls 113 are preferably knurled in order that the rolls may better grip the two strips of gelatin.

To guide the movement of gelatin strips 33 across the opposite faces of the nozzle 71, the apparatus is provided with two axially skewed guide rolls 125 and two axially horizontal, power driven, guide rolls 127. The skewed guide rolls 125 are journaled at one end upon a multiple bearing bracket 128 and at the other end by two elongated brackets 129 affixed to the upright 69. The power driven guide rolls 127 are keyed to two horizontal supporting shafts 131 which are journaled in the upright 69 by suitable bearings, not shown, and are mechanically connected together by two gears 133. A suitable opening 135 is provided in the upright 69 to permit the gelatin strips 33 to be led directly from the take-off rolls 35 to the guide rolls 125.

During the capsule forming and filling operations, the gelatin strips 33 must not be moved. This requirement makes it necessary that the squeeze rolls 113 and the power driven guide rolls 127 shall be intermittently operated. The mechanism for accomplishing this intermittent operation includes a crank 137 keyed to the pump cam shaft 100, which shaft is continuously rotated at uniform speed during the operation of the machine, a rotatable shaft 139 mechanically connected to the engaging gears 133, which are keyed to the guide roll supporting shafts 131, and to the engaging gears 117, which are keyed to the squeeze roll supporting shafts 115, by a large gear 140 keyed to the shaft 139, two pinion gears 141 mounted on opposite ends of a rotatable shaft 142 and the outer of which drives a third pinion 143 keyed to one of the shafts 131, an idler gear 145 intermediate the engaging gears 143 and the engaging gears 117, a ratchet drive mechanism 147 for the gear 140, and two link members 149 and 151 for connecting the ratchet mechanism 147 to the pump cam shaft crank 137. The shaft 139 is journaled at one end upon the upright 69 and at the other end upon an outboard pedestal bearing 152. The idler gear 145 is journaled upon a suitable stub shaft 153 (Figure 6) which is rigidly attached to the upright 69.

Figures 5, 7, 8:
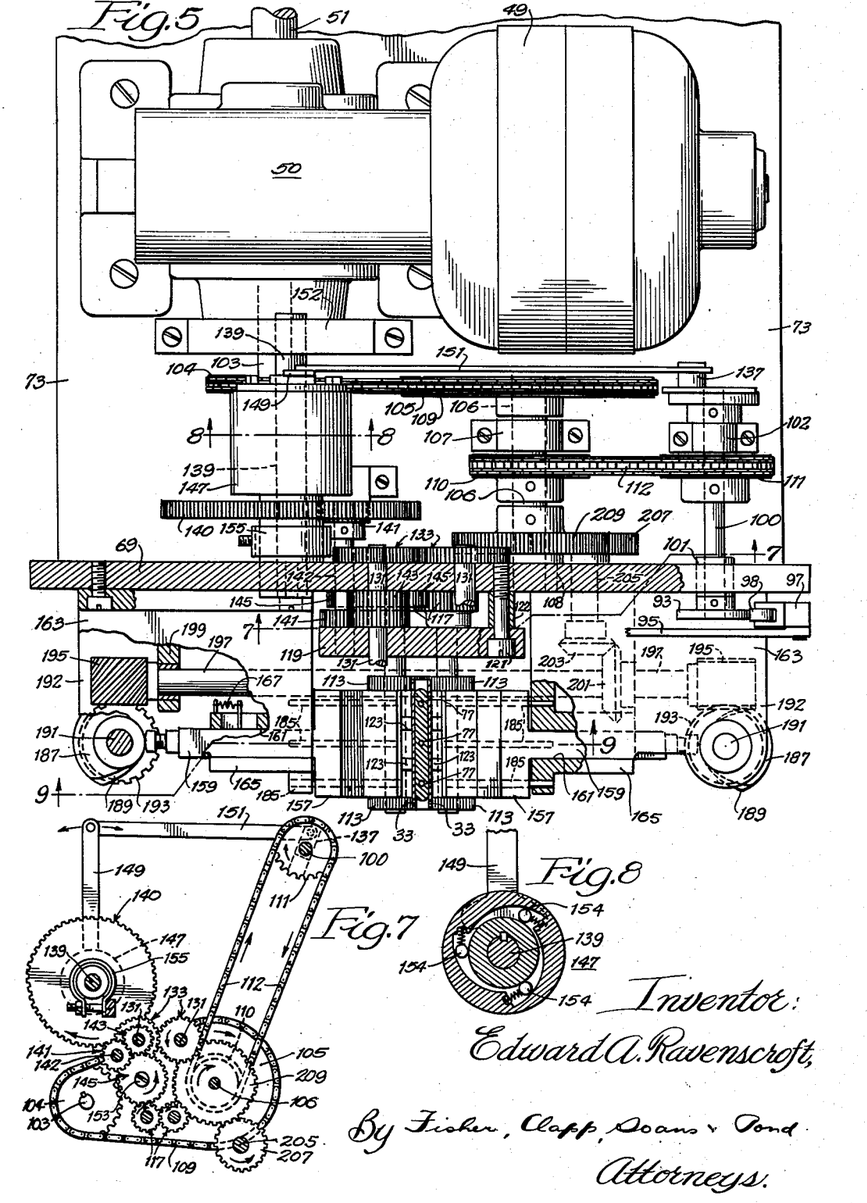
Figure 5 is a plan view and Figure 6 is a side elevational view of the capsule making machine illustrated in Figure 3.
Figure 7 is a diagrammatic view illustrating various elements of driving mechanism embodied into the capsule making machine of my invention.
Figure 8 is a fragmentary, sectional view illustrating the features of a ratchet type drive clutch utilized in conjunction with the drive mechanism of Figure 7.

The ratchet mechanism 147 may be of any desired type, one particularly suitable form utilizing roller wedging members 154 which are illustrated in Figure 8. To prevent any backlash during the ratcheting operation, the gear 140 is keyed to an adjustable friction brake 155 which is set so as to normally exert a fairly substantial braking action on the gear 140 and the gearing connected thereto.

The mechanism utilized to hold the strips 33 of sheet gelatin in contact with each other so as to form expansible envelopes or sacks which individually connect with the outlet end of each of the nozzle passageways 77 comprises two oppositely arranged sealing members 157 each of which is provided with a rectangularly shaped rear portion 159 adapted to engage a guide slot 161 formed in a secondary frame member 163 which is bolted to the upright 69. The guide slot 161 is normally closed by a removable plate 165, and the sealing members are biased to the separated position of Figures 3 and 9 by suitable springs 167. Three symmetrically spaced, cylindrical passageways 169 are provided in each of the sealing members 157, and these passageways 169 are adapted to align when the sealing members are in the engaged position of Figure 11 in such manner that the two gelatin sheets 33 are held together so as to form a circular envelope or sack connecting with the outlet end of each of the nozzle passageways 77. The two side walls of each of these gelatin envelopes or sacks may be expanded freely into the cylindrical cavity 171 (see Figure 11) formed by the aligning passageways 169.

Figure 4:
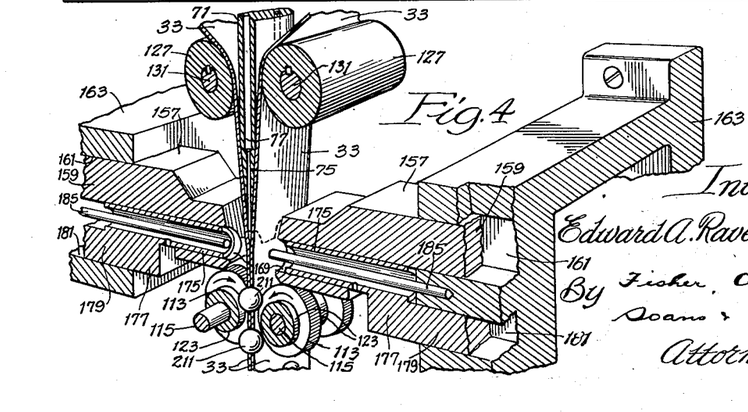
Figure 4 is a fragmentary perspective view, partially in section, of a portion of the mechanism of the capsule making machine illustrated in Figure 3.
Figures 9, 10, 11, 12, 13, 14:
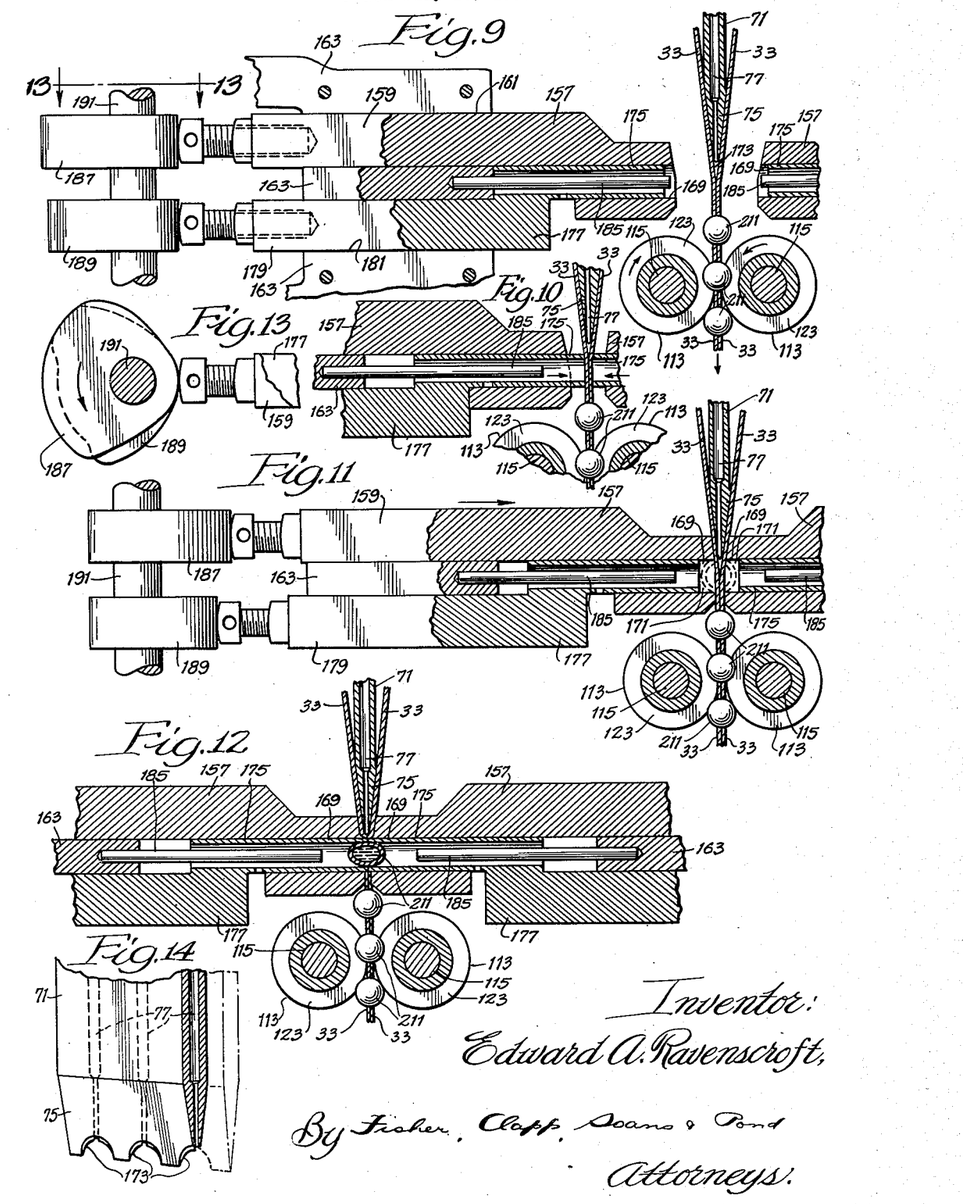
Figures 9, 10, 11, and 12 are enlarged fragmentary views showing various steps in the formation of capsules by the capsule making machine of my invention.
Figure 13 is a fragmentary side elevational view of certain of the operating cams forming a part of the capsule making machine of my invention.
Figure 14 is a perspective view, partially in section, of one form of nozzle mechanism which may be used in conjunction with the capsule machine of the present invention.

The opposed surfaces of the sealing members 157 are cut away, as illustrated particularly in Figures 4 and 9, along an angle substantially equal to the angle formed between the two opposed sides of the wedge shaped end portion 75 of the nozzle member 71 in order to obtain a more satisfactory seal between the nozzle 71 and the gelatin envelopes or sacks formed by the sealing members 157. Also, in order to prevent the nozzle 71 from projecting into the cylindrical cavities 171 within which the capsules are formed during the operation of the machine, the wedge shaped portion 75 of the nozzle 71 is provided with three semi-circular cut away portions 173 which align respectively with the cylindrical passageways 169 when the sealing members 157 are in the engaged position.

For the purpose of cutting the filled envelopes or sacks from the two strips of gelatin 33 and thereby forming capsules during the operation of the machine, thin walled, hollow, cylindrical cutter members 175 are disposed for slidable movement within each of the cylindrical passageways 169 formed within the sealing members 157. Each of the three cutter members 175 associated with each sealing member 157 is attached at its inner end to a common operating member 177 having a rectangularly shaped rear portion 179 adapted to engage a guide slot 181 which, similarly to the guide slot 161 for the sealing members 157, is formed in the secondary frame 163 and is closed by the cover plate 165. The cutter members 175 are biased to the retracted position of Figure 9 by means of springs 183, and in order to prevent the formed capsules from being drawn into the cylindrical passageways 169 in the sealing members 157 at the conclusion of the cutting operation, an ejector pin 185 is located centrally within each of the passageways 169 and the cutter member 175. Each of the ejector pins 185 is permanently affixed at its rear end to the frame 163 or to the cover plate 165 in the case of the outermost pins.

Proper sequential operation of the sealing and cutter members 157 and 175 is accomplished by the use of two pairs of cams 187 and 189 which are supported upon vertical cam shafts 191 journaled in suitable bearing supports 192 forming an integral part of the secondary frame members 163. In order that both of the vertical cam shafts 191 shall rotate together at uniform speed, the lower end of each of the vertical cam shafts 191 terminates in a right angle gear 193 which meshes with a suitable cooperating right angle gear 195 keyed to a horizontal shaft 197 which is journaled in other bearing supports 199, likewise forming an integral part of the frame members 163. The horizontal shaft 197 is mechanically connected to the low speed, power take-off shaft 103 by means of a pair of right angle gears 201 and 203, a short shaft 205 journaled on the upright 69, and a pinion gear 207 which meshes with a drive gear 209 keyed to the intermediate shaft 106, which shaft is in turn mechanically connected to the low speed, power take-off shaft 103 by means of the gears 104 and 105 and the chain 109.

Figure 3:
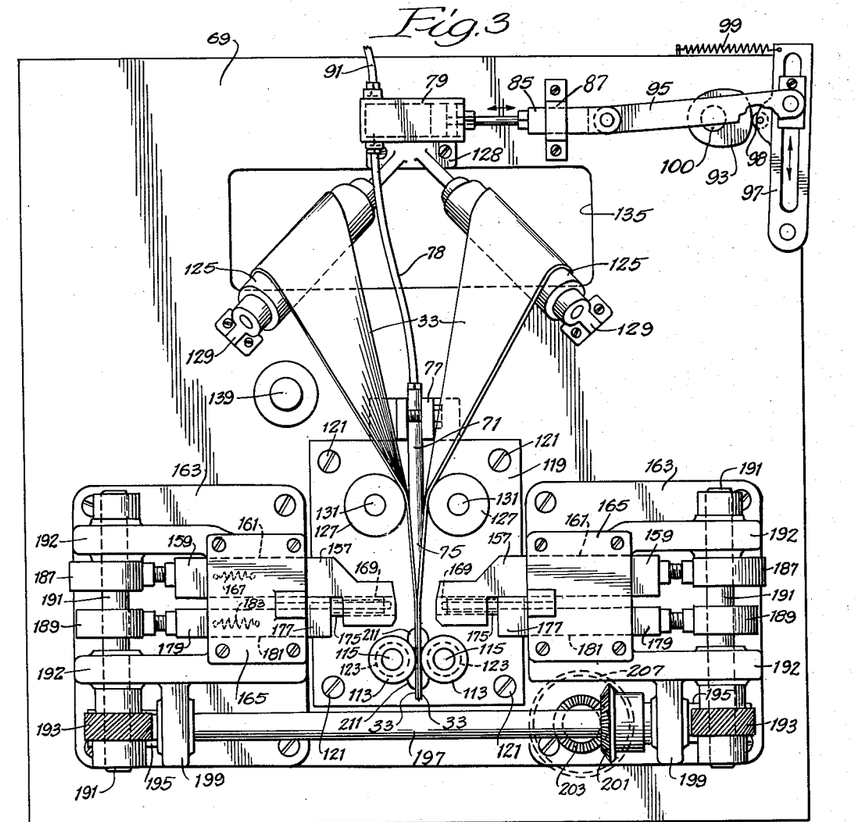
Figure 3 is a front elevational view of the capsule making machine of my invention.

The first step in the capsule forming operation is illustrated in Figures 3, 4, and 9. At this point, the squeeze rolls 123 have been operated in response to a forward ratcheting operation of the ratchet mechanism 147 to move the two gelatin strips 33 simultaneously along the sides of the nozzle 71 a distance substantially equal to about one and one-half times the diameter of the finished capsules. During this movement the sealing and cutter members 157 and 175 were in the separated position.

At the conclusion of the ratcheting operation the two cams 189 which operate the cutter members 175 move those members forward against the biasing action of the springs 183 from the position of Figure 9 to the position of Figure 10, in which latter position the opposed annular surfaces of the cutter members 175 are separated by a distance approximately equal to the combined thickness of the two gelatin sheets 33. The purpose of this movement of the cutter members 175 is to press the sheets 33 tightly together and thereby expel any air which might tend to become entrapped therebetween prior to the filling operation. Further rotation of the two vertical cam shafts 191 and the cams 187 and 189 causes the sealing members 157 to be moved from the position of Figure 9 to the engaging position of Figure 11 and simultaneously retracts each of the cutter members 175 a distance somewhat greater than about one-half the diameter of the finished capsules. The engagement of the opposing surfaces of the sealing members 157 is such that a circular area of the two gelatin sheets 33 is confined adjacent to or about the outlet opening of each of the nozzle passageways 71, thereby forming envelopes or sacks which are capable of expanding when the filling liquid is injected into the cylindrical cavities 171 formed by the aligning passageways 169. The sealing members 157 should press firmly against the gelatin sheets 33, but should not engage the sheets too tightly in order to obviate any possibility of cutting therethrough.

While the sealing members 157 are held in the engaged position of Figure 11, the control cam 93 for the measuring pumps 79 moves to effect the operation of those pumps, and a predetermined measured quantity of the liquid filling material is forced into each of the three circular gelatin envelopes or sacks whose outlines are defined by the engaging surfaces of the sealing members 157. As a result of this operation, the envelopes or sacks are expanded to a substantially spherical form as illustrated by the dotted lines in Figure 11. Immediately following the expansion of the gelatin envelopes or sacks, the control cams 189 for the cutter members 175 cause those members to move from the partially separated position of Figure 11 to the position of Figure 12, in which latter position the opposed annular surfaces of the cutter members engage with substantial pressure. The result of this movement of the cutter members 175 is to cut out each of the expanded envelopes or sacks from the main body of the two sheets 33 and to simultaneously seal the edges of the resulting capsules 211. The completion of this cutting operation is illustrated in Figure 12.

Immediately following the engagement of the cutter members 175 which marks the completion of the capsule forming operation, the cams 187 and 189 and the associated springs 167 and 183 which operate the sealing and cutter members 157 and 175 effect the movement of those members from the position of Figure 12 to the separated position of Figure 9. At this point in the operation of the machine, the crank 139 keyed to the constantly rotating shaft 100 is turned to a position in which it again produces operation of the ratcheting mechanism 147 and corresponding rotation of the squeeze rolls 113 and the power driven guide rolls 127, whereby the two sheets of gelatin 33 are drawn down so as to move the capsule 211 just completed from the position of Figure 12 to the position of Figure 9, thereby presenting new portions of the gelatin sheets 33 for the machine to operate upon.

Under ordinary operating conditions, the capsule 211 will not be cut entirely free from the two sheets 33 by the cutter members 175, and as a matter of fact, it is desirable that they shall not be completely cut away from those sheets since a slight attachment of the capsules 211 to the sheets provides a convenient means for positioning and holding the capsules during their passage through the squeeze rolls 113, after which the capsules may be very readily removed from the two gelatin sheets 33 by brushing or the like. The portion of the gelatin sheets 33 which remains after the capsules 211 have been removed therefrom constitutes what is known in the trade as a "net." The gelatin in the net may, of course, be reclaimed. To prevent the gelatin sheets 33 from sticking to any part of the apparatus, it may be found necessary to apply mineral oil to various of the surfaces contacted by the gelatin sheets. Suitable apparatus for accomplishing this is, of course, well known in the art.

Figures 15, 16, 17:
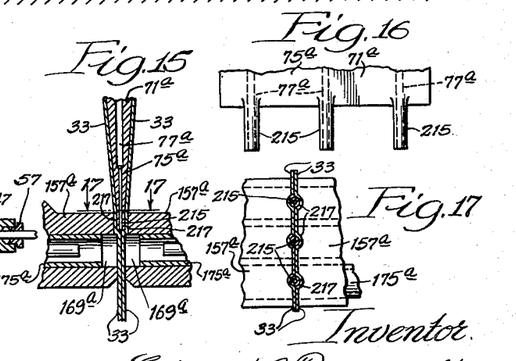
Figures 15, 16, and 17 are fragmentary views illustrating a modified form of nozzle mechanism and certain associated apparatus.

A somewhat modified form of nozzle is illustrated at 71ª in Figures 15, 16 and 17. In the structure of these figures, the wedge shaped end portions 75ª of the nozzle plate has been cut away to provide what constitutes three hollow hypodermic needle-like portions 215 each of which connects with one of the nozzle passageways 71ᵃ. During the envelope or sack expanding operation these needle-like members 215 are held within a cylindrical passageway 217 formed by semi-circular grooves cut in the sealing members 157ᵃ as illustrated in Figures 15 and 17. The sealing members 157ᵃ, the cutting members 175ᵃ, and the other elements of the apparatus, except for the slight differences in shape made necessary by the modified nozzle 71ᵃ are exactly similar to the corresponding elements 157, 175, etc. Likewise, the operation of the machine when utilizing this modified form of nozzle 71ᵃ and modified sealing members 157ᵃ is precisely the same as the operation of the machine described in the foregoing. The modified form of nozzle and sealing members will, in some instances, produce a somewhat better seal between the nozzle and the two sheets of gelatin, and for this reason may be preferred for making capsules of certain types.

In all instances it is not essential that the cutter members 175 (or 175ᵃ) be moved into the partially engaged position of Figure 10 as the first step in the operation of the machine. While this mode of operation is preferred for the reason that it effects positive elimination of the air from between the two sheets of gelatin, the air may be eliminated by other means, or under certain circumstances the amount entrapped may be so small as to be unobjectionable. If the Figure 10 step is eliminated, the only change in the operational sequence will be that the step of Figure 11 will follow directly after the step of Figure 9.

In the foregoing I have disclosed the features of a novel type of capsule making machine which is particularly suited for manufacturing liquid filled, soft gelatin capsules through the use of two continuous sheets or strips of gelatin. In this connection, it will be understood that the machine of my invention, by virtue of the fact that the measuring pumps for the filling material are of the positive displacement type, can also be used for manufacturing capsules which are filled with pasty or semi-liquid substances. The machine, while utilizing a rather substantial number of mechanical elements, operates on a simple yet entirely novel principle, and it will be apparent to those skilled in the art that various structural arrangements other than the exact apparatus disclosed may be utilized for carrying out the invention. Accordingly, it is my desire that the accompanying claims shall be given the broadest possible construction consistent with the language appearing therein and the prior art.

I claim the following as my invention:

1. In apparatus of the class described, gelatin sheet forming means operable to provide two continuous strips of sheet gelatin, a nozzle member, means for moving said strips into flatwise contact with each other adjacent the outlet of said nozzle member, a pair of oppositely arranged sealing members each of which is provided with a centrally located passageway, means for moving said sealing members toward each other with said passageways in substantial alignment so as to hold together a predetermined area of said sheets and thereby form an expansible envelope about the outlet of said nozzle, means for forcing a quantity of filling material through the outet of said nozzle into said envelope, and tubular cutter members movable through said aligned passageways into engagement with each other, whereby said filled envelope is severed about its entire periphery from said sheets and the edges of said envelope are simultaneously sealed to form a capsule.

2. In a capsule making machine of the class described, gelatin sheet forming means operable to provide two continuous strips of sheet gelatin, a generally wedge shaped nozzle member which is provided with a plurality of spaced outlet openings, means for moving said strips into flatwise contact with each other adjacent the outlet end of said nozzle, oppositely arranged sealing members movable toward each other from a separated position to a sealing position, each of said sealing members being provided with a plurality of spaced passageways adapted to align with said spaced outlet openings when said sealing members are in the sealing position, means for moving said sealing members from said separated position to said sealing position during each operation of said machine whereby predetermined areas of said sheets are held together to form an expansible envelope about each of said outlet openings, pump means for forcing a quantity of liquid filling material through each of said outlet openings into the adjacent expansible envelope, tubular cutter members movable within said aligning passageways to sever each of said filled envelopes from said sheets and to simultaneously seal the edges of said envelopes to form a plurality of filled capsules, and means for separating said sealing members following each operation of said cutter members.

3. In apparatus of the class described, gelatin sheet forming means operable to provide two continuous strips of sheet gelatin, a generally wedge shaped nozzle member, means including guide rollers for conducting said sheets of gelatin along opposite sides of said wedge shaped nozzle member and for bringing said sheets into flatwise contact with each other adjacent the outlet of said nozzle member, a pair of oppositely arranged, slidably supported sealing members axially movable toward each other from a separated position to a sealing position, said sealing members being provided with aligned, cylindrical passageways which define a cylindrical cavity when said members are in the sealing position, means for intermittently advancing said sheets simultaneously, means actuable following each intermittent forward movement of said sheets to move said sealing members from the separated position to the sealing position, in which latter position said sealing members confine a circular area of said sheets so as to form an expansible envelope about said outlet opening, pump means for forcing a quantity of liquid filling material through said outlet opening into the adjacent expansible envelope, thin walled, tubular cutter members movable within said passageways from a separated position to an engaging position, means actuable to move said cutter members into engagement following each operation of said pump means, whereby said filled envelope is severed from said sheets and the edges thereof are sealed together so as to form a capsule, and means for moving said sealing members and said cutter members to the separated position following each cutting operation.

4. In a machine of the class described, gelatin sheet forming means operable to provide two strips of sheet gelatin, a nozzle member having an outlet opening located adjacent the end thereof, means operable to conduct said sheets of gelatin into flatwise proximity with each other adjacent the outlet end of said nozzle and to hold said sheets of gelatin stationary in that position for a predetermined time interval during each operation of said machine, sealing means operable during said interval to enclose a predetermined area of said sheets so as to form an expansible envelope, means operable during said interval and subsequent to said sealing operation to force a quantity of liquid filling material through said outlet opening into said expansible envelope, and cutter means operable during the final portion of said interval to sever said filled envelope about its entire periphery from said sheets and to simultaneously seal the edges of said envelope to form a capsule, said sheet conducting means being operable following each cutting operation to simultaneously advance said sheets and to move said capsule away from said nozzle.

5. In a machine of the class described, a gelatin sheet forming means operable to provide two strips of sheet gelatin, a nozzle member having an outlet opening located adjacent the end thereof, means operable to conduct said sheets of gelatin into flatwise proximity with each other adjacent the outlet end of said nozzle and to hold said sheets of gelatin stationary in that position for a predetermined time interval during each operation of said machine, means operable during the initial portion of said interval to press said sheets into flatwise contact with each other to expel any air which might be entrapped therebetween, sealing means operable during said interval and following said air removing operation to enclose a predetermined area of said sheets so as to form an expansible envelope which is open only to the outlet of said nozzle, means operable during said interval and subsequent to said sealing operation to force a quantity of liquid filling material through said outlet opening into said expansible envelope, and cutter means operable during the final portion of said interval to sever said filled envelope about its entire periphery from said sheets and to simultaneously seal the edges of said envelope to form a capsule, said sheet conducting means being operable following each cutting operation to simultaneously advance said sheets and to move said capsule away from said nozzle.

6. In a machine of the class described, gelatin sheet forming means operable to provide two continuous strips of sheet gelatin, a generally wedge-shaped nozzle member having an outlet opening located adjacent the end thereof, means operable to conduct said sheets of gelatin along opposite sides of said wedge-shaped nozzle and to bring said sheets into proximity with each other adjacent the outlet end of said nozzle, said sheet conducting means being operable to hold said sheets of gelatin stationary adjacent the outlet of said nozzle for a predetermined time interval during each operation of said machine, sealing means operable during said interval to enclose a predetermined area of said sheets so as to form an expansible envelope which is open only to the outlet of said nozzle, pump means operable during said interval and following each operation of said sealing means to force a quantity of liquid filling material through said outlet opening into said expansible envelope, and cutter means operable during the final portion of said interval to sever said filled envelope about its entire periphery from said sheets and to simultaneously seal the edges of said envelope to form a capsule, said sheet conducting means being operable following each cutting operation to simultaneously advance said sheets and to move said capsule away from said nozzle.

7. In a machine of the class described, gelatin sheet forming means operable to provide two continuous strips of gelatin, a generally wedge-shaped nozzle member having an outlet opening located adjacent the end thereof, means operable to conduct said sheets of gelatin along opposite sides of said wedge-shaped nozzle member and to bring said sheets into flatwise proximity with each other adjacent the outlet end of said nozzle, said sheet conducting means being operable to hold said sheets of gelatin stationary adjacent the outlet of said nozzle for a predetermined time interval during each operation of said machine, means operable during the initial portion of said interval to press said sheets into flatwise contact with each other to expel any air which may be entrapped therebetween, sealing means operable during said interval and following said air expelling operation to enclose a predetermined area of said sheets so as to form an expansible envelope which is open only to the outlet of said nozzle, pump means operable during each said interval and following each operation of said sealing means to force a quantity of liquid filling material through said outlet opening into said expansible envelope, and cutter means operable during the latter portion of said interval to sever said filled envelope about its entire periphery from said sheets and to simultaneously seal the edges of said envelope to form a capsule, said sheet conducting means being operable following each cutting operation to simultaneously advance said sheets and to move said capsule away from said nozzle.

8. In a machine of the class described, gelatin sheet forming means operable to provide two continuous strips of sheet gelatin, a generally wedge-shaped nozzle member provided with a plurality of spaced outlet openings located adjacent the end thereof, means for conducting said sheets of gelatin along opposite sides of said wedge-shaped nozzle member and for bringing said sheets into flatwise proximity with each other adjacent the outlet end of said nozzle, said sheet conducting means being operable to hold said strips of gelatin stationary adjacent the outlet of said nozzle for a predetermined time interval during each operation of said machine, sealing means operable during each said interval to enclose predetermined areas of said sheets so as to form a plurality of separate expansible envelopes each of which is open only to one of the outlets of said nozzle, means operable during each said interval following each operation of said sealing means to force a quantity of liquid filling material through said outlet opening into each of said expansible envelopes, and cutter means operable during the final portion of each said interval to sever each of said filled envelopes about its entire periphery from said sheets and to simultaneously seal the edges of said envelopes to form a plurality of separate capsules, said sheet conducting means being operable following each cutting operation to simultaneously advance said sheets and move said capsules away from said nozzle.

9. The method of continuously manufacturing liquid filled, soft gelatin capsules which consists in bringing two sheets of soft gelatin into flatwise proximity with each other adjacent the outlet opening of a stationary nozzle member, and then, while holding said sheets stationary with reference to said nozzle member, forcibly pressing said sheets into flatwise contact with each other to expel any air which might be entrapped therebetween, holding together a predetermined area of said sheets so as to form an expansible envelope open only to said nozzle outlet, forcing liquid filling material into and thereby expanding this envelope, then severing the filled envelope from the sheets by an operation which simultaneously seals the entire peripheral edges of said envelope to form a capsule, all without relative movement of said sheets and nozzle, and finally moving said sheets and formed capsule relative to said nozzle to permit a repetition of said procedure.

10. The method of continuously manufacturing a plurality of liquid filled, soft gelatin capsules which consists in bringing two sheets of soft gelatin into flatwise proximity with each other adjacent a plurality of spaced nozzle outlet openings in a stationary nozzle member, and then, while holding said sheets stationary with reference to said nozzle member, forcibly pressing said sheets into flatwise contact with each other to expel any air which might be entrapped therebetween, confining said sheets adjacent said nozzle outlet openings so as to form a plurality of expansible envelopes each of which is open only to one of said nozzle outlets, forcing liquid material through each of said nozzle outlets to fill and thereby expand the adjacent envelopes, then severing the filled envelopes from the sheets by an operation which simultaneously seals the entire peripheral edges of said envelopes to form a plurality of capsules, all within relative movement of said sheets and nozzle, and finally moving said sheets and formed capsules relative to said nozzle to permit a repetition of said procedure.

EDWARD A. RAVENSCROFT.